United States Patent [19]
Chen

[11] Patent Number: 5,241,395
[45] Date of Patent: Aug. 31, 1993

[54] ADAPTIVE TRANSFORM CODING USING VARIABLE BLOCK SIZE

[75] Inventor: Cheng-Tie Chen, Bridgewater Township, N.J.

[73] Assignee: Bell Communications Research, Inc., Livingston, N.J.

[21] Appl. No.: 859,614

[22] Filed: Mar. 23, 1992

Related U.S. Application Data

[63] Continuation of Ser. No. 389,420, Aug. 7, 1989, abandoned.

[51] Int. Cl.$^5$ .................. H04N 1/415; H04N 1/41
[52] U.S. Cl. .................. 358/261.3; 358/426; 358/433; 382/56
[58] Field of Search .................. 358/426, 261.1, 261.2, 358/261.3, 261.4, 430, 432, 433, 464, 465, 466; 382/56

[56] References Cited

U.S. PATENT DOCUMENTS

| | | | |
|---|---|---|---|
| 4,261,018 | 4/1981 | Knowlton | 358/426 |
| 4,831,659 | 5/1989 | Miyaoka et al. | 358/433 |
| 4,944,023 | 7/1990 | Imao et al. | 382/56 |
| 4,947,447 | 8/1990 | Miyaoka et al. | 358/433 |
| 5,021,891 | 6/1991 | Lee | 358/432 |
| 5,060,285 | 10/1991 | Dixit et al. | 358/433 |

OTHER PUBLICATIONS

"Scene Adaptive Coder," W. H. Chen et al., IEEE Trans. Commun. vol. COM-32, No. 3, pp. 225-232, Mar. 1984.

"Hybrid Transform Video Coding Scheme for Low Bit Rate: An Improvement of the Reference Algorithm," N. Texier et al., Proc. Picture Coding Symp., pp. 8.4-1-2, Turin, Italy, Sep. 1988.

Primary Examiner—Edward L. Coles, Sr.
Assistant Examiner—Thomas D. Lee
Attorney, Agent, or Firm—Leonard Charles Suchyta; Joseph Giordano

[57] ABSTRACT

An adaptive transform coding algorithm for a still image utilizes a quadtree based variable block size discrete cosine transform to achieve a better tradeoff between bit rate and image quality. The choice of appropriate block size is made according to a mean based decision rule which can discriminate various image contents for better visual quality.

16 Claims, 2 Drawing Sheets

ADAPTIVE TRANSFORM CODING USING VARIABLE BLOCK SIZE

This application is a continuation of application Ser. No. 07/389,420, filed Aug. 7, 1989, abandoned.

RELATED APPLICATION

A patent application entitled "Adaptive Transform Coding of Still Images", filed for C. T. Chen and D. J. LeGall on Jul. 19, 1989 and bearing Ser. No. 07/381,860 is assigned to the assignee hereof and contains subject matter related to the subject matter of the present application.

FIELD OF THE INVENTION

The present invention relates to a method for coding still images. More particularly, the present invention relates to a transform coding algorithm for an image in which the image is divided into pixel blocks of different size according to image contents and in which an orthogonal transform such as a discrete cosine transform is applied to the pixel blocks.

BACKGROUND OF THE INVENTION

Transform coding has proven to be an efficient means of coding a still image signal for transmission to a remote receiver.

In accordance with a basic transform image coding algorithm, a still image is divided into blocks of pixels. For example, each block of pixels may be a 16×16 block. Each block of pixels undergoes a two-dimensional orthogonal transform to produce a two-dimensional array of transform coefficients. For still image coding applications, the discrete cosine transform has emerged as the best orthogonal transform from the point of view of image compression and ease of implementation.

After a block of pixels undergoes a transform such as a discrete cosine transform, the resulting transform coefficients are subject to compression by thresholding and quantization. Thresholding involves setting all coefficients whose magnitude is smaller than a threshold value T equal to zero. In some thresholding processes, when a coefficient has a magnitude greater than T, T is subtracted if the coefficient is positive and T is added if the coefficient is negative. The DC transform coefficient may be excluded from the thresholding process. Quantization involves scaling a coefficient by a step size Q and rounding off to the nearest integer.

After compression, the compressed transform coefficients are then coded, for example, using a Huffman code, to form a bit stream for transmission to a remote receiver. At the receiver, an inverse process occurs to reconstruct the original block pixels. Thus, the received bit stream is decoded and the received quantized transform coefficients are expanded by the quantization step size. An inverse transform such as an inverse discrete cosine transform is then applied to the transform coefficients to reconstruct the block of pixels. In this manner, an image is transmitted block by block from a transmitter to a receiver.

In the conventional transform coding algorithm described above, the parameters of importance are the block size, the threshold value T, and the quantization step size Q. The conventional transform coding algorithm uses fixed parameters for all blocks from an image, i.e., the block size, threshold value T and quantization step size Q remain constant for all blocks within an image and from image to image.

The drawback of using fixed parameters is that the bit rate and image quality cannot achieve their best tradeoff for a wide variety of images. Higher image quality is obtained at the price of higher bit rate for those busy image areas where the same visual quality may be achieved at a lower bit rate with another set of parameters.

To yield a better tradeoff between the bit rate and image quality, the parameters used in the transform coding algorithm have to be adaptive to the image contents. This motivates an adaptive transform coding approach for still images, where higher image quality can be obtained at a lower average bit rate (see e.g., W. H. Chen et al, "Scene Adaptive Coder", *IEEE Trans. Commun.*, Vol COM-32, pp 225–232, March 1984; N. Texier et al "Hybrid Transform Video Coding Scheme for Low Bit Rate: An Improvement of the Reference Algorithm", *Proc. Picture Coding Symp.* pp. 8.4-1-2, Turin, Italy, September 1988).

In the above-identified patent application, an adaptive transform coding algorithm is disclosed which utilizes an adaptive threshold value T and an adaptive quantization step size Q along with a fixed block size. In particular, the compression parameters Q and T are selected individually for each block of pixels. In general, smaller (larger) compression parameters result in higher (lower) bit rates and image quality. Thus, large compression parameters are used for busy blocks where the human visual system is not very sensitive to degradation and small compression parameters are used for smooth blocks where the human visual system to degradation.

Illustratively, a measure of the busyness of a block is the magnitude of the $(K+1)^{th}$ most significant transform coefficient, where K is an integer which remains the same for all blocks in an image or in a plurality of images. The magnitude of the $(K+1)^{th}$ most significant transform coefficient is used to determine the threshold value T and quantization step size Q individually for each block of pixels. The magnitude of the $(K+1)^{th}$ transform coefficient is large for busy blocks where the human visual system is not sensitive to degradation and results in large compression parameters and lower bit rates. On the other hand, for smooth blocks, the transform coefficients fall off rapidly, and the magnitude of the $(K+1)^{th}$ transform coefficient is small resulting in small compression parameters and higher bit rates. In comparison to the conventional transform coding algorithm, the adaptive transform coding algorithm described above provides more consistent image quality and lower average bit rate for a wide variety of images.

It is an object of the present invention to provide an alternative adaptive transform coding algorithm wherein adaptivity is achieved by varying the pixel block size according to image contents.

In particular, a larger pixel block size advantageously results in better compression because more pixels are provided for decorrelation in the transform process. However, an inherent disadvantage of a large block size is that the quality of the resulting reconstructed image is not consistent amongst various images or from block to block within a single image. For example, blocking and ringing artifacts are more visible in a reconstructed image where a relatively larger pixel block size is used if the image contains high contrast edges. On the other hand, small pixel block size enables less compression but better quality of the reconstructed image.

Therefore, it is a further object of the present invention to provide an adaptive transform coding algorithm which takes advantage of the compression capability of large block size and the high visual image quality of small block size by choosing the appropriate block size according to the image contents so as to achieve a better tradeoff between bit rate and image quality.

SUMMARY OF THE INVENTION

The present invention is an adaptive transform coding algorithm wherein adaptivity is achieved via a variable block size determined according to image contents.

An image is first divided into relatively large blocks of pixels of size $M \times M$. Let $N \times N$ be the size of the smallest block of pixels of interest in the inventive algorithm, where $M = N \times 2^{K-1}$ and where K is a positive integer. Each $M \times M$ block is decomposed into $4^{K-1}$ blocks of size $N \times N$ by successively splitting each block into four equally sized sub-blocks until the smallest sub-block of size $N \times N$ is reached.

The successive splitting of blocks results in a hierarchy of sub-blocks with K levels, which levels are designated $i = 0, 1, 2 \ldots K-1$. At each level in the hierarchy, the sub-block size is $M/2^i \times M/2^i$. All sub-blocks at the same level of the hierarchy are in the same "generation" and sub-blocks derived from the same parent sub-block are said to be brother/sister sub-blocks.

Illustratively, a three-level hierarchy of sub-blocks (i.e. K=3) is utilized. For example, if M=16, the i=0 level of the hierarchy comprises one $16 \times 16$ block. The i=1 level of the hierarchy comprises four $8 \times 8$ brother/sister sub-blocks arrived at by splitting the $16 \times 16$ block into four sub-blocks. The $i = K-1 = 2$ level of the hierarchy comprises sixteen $4 \times 4$ sub-blocks (so that N=4), which sub-blocks are arrived at by splitting each $8 \times 8$ sub-block four ways. Thus, a hierarchy of levels i=0,1, and 2 is achieved with sub-blocks of size $16 \times 16$, $8 \times 8$, and $4 \times 4$, respectively. It should be noted that each of the $4 \times 4$ sub-blocks in the i=2 level of the hierarchy is childless since $4 \times 4$ is the smallest block size of interest.

In the inventive algorithm, the maximum sized block to which an orthogonal transform such as a discrete cosine transform is applied is an $M \times M$ block and the smallest block to which a discrete cosine transform is applied is $N \times N$. Depending on the image contents of a particular $M \times M$ block, the discrete cosine transform may be applied to the $M \times M$ block as a whole, to all $4^{K-1}$ sub-blocks of size $N \times N$ which are derived from the $M \times M$ block, or to a mosaic of sub-blocks of different sizes, which sizes are given by $M/2^i \times M/2^i$ where $i = 0, 1, \ldots K-1$.

Thus, in the three level hierarchy, presented as an example above, the discrete cosine transform may be applied to a $16 \times 16$ block as a whole. Alternatively, depending on image contents, the discrete cosine transform may be applied individually to the sixteen $4 \times 4$ sub-blocks derived from the $16 \times 16$ block. In another case, the discrete cosine transform may be applied individually to four $4 \times 4$ brother/sister sub-blocks in the $i = K-1 = 2$ level of the hierarchy and to three $8 \times 8$ brother/sister sub-blocks in the $i = K-2 = 1$ level of the hierarchy.

To determine the blocks to which the discrete cosine transform is applied, a testing and selective merging process is utilized based on image contents.

Starting at the $i = K-1$ level of the hierarchy, the algorithm first checks to see if the discrete cosine transform should be applied to sub-blocks of size $N \times N$ (i.e. blocks of $M/2^{K-1} \times M/2^{K-1}$) by using a test involving four adjacent brother/sister $N \times N$ blocks. If the test is negative, the four adjacent $N \times N$ blocks are merged to form a single (now childless) $2N \times 2N$ block (i.e. a block of size $M/2^{K-2} \times M/2^{K-2}$). If the test is positive the discrete cosine transform is applied individually to the four brother/sister blocks of size $N \times N$.

If the testing and merging process, when applied to the (K−1) level of the hierarchy, results in the formation of four (now childless) brother/sister $2N \times 2N$ sub-blocks in the (K−2) level of the hierarchy, the test is applied to determine if the four $2N \times 2N$ sub-blocks should be merged. If such $2N \times 2N$ sub-blocks are not merged, the discrete cosine transform is applied to the $2N \times 2N$ sub-blocks individually. Otherwise, these four $2N \times 2N$ sub-blocks are merged into a single $4N \times 4N$ (now childless) block. Similarly, if the testing and merging process, when applied to the K−1 level of the hierarchy, results in the formation of one or more $2N \times 2N$ sub-blocks in the (K−2) level of the hierarchy, but not a set of four childless brother/sister $2N \times 2N$ sub-blocks, then the discrete cosine transform is applied individually to the $2N \times 2N$ sub-blocks.

This testing and selective merger process continues up the hierarchy until the $M \times M$ block is reached in which case the discrete cosine transform is applied to the $M \times M$ block or until at some level in the hierarchy there are no possible mergers left (i.e., no sets of four childless brother/sister sub-blocks to be tested) so that the discrete cosine transform is applied to the remaining sub-blocks at that level in the hierarchy.

Illustratively, the test to determine whether or not to merge a set of brother/sister sub-blocks at a particular level of the hierarchy utilizes the mean pixel value of the sub-blocks. Let $m_i(k)$; $k = 1,2,3,4$ represent the mean pixel value of four brother/sister sub-blocks at the $i^{th}$ level of the hierarchy. If there is a $j \neq k$ such that $$|m_i(j) - m_i(k)| > t_i \qquad (1)$$

do not merge; otherwise merge, where $t_i$ is a predetermined value for the $i^{th}$ level in the hierarchy.

Using the above-described sub-block hierarchy, and the above-described testing and selective merging steps, an $M \times M$ block is decomposed into one or more sub-blocks to which a discrete cosine transform is applied.

As indicated above, in discrete cosine transform coding, large block size introduces visible degradation if the block contains high contrast edges. Therefore, it is desirable to keep the block size as small as possible for such areas. The testing criterion based on mean pixel value described above can discriminate quite well between those areas with high contrast edges and other areas where the human visual system is not sensitive to degradation and for which larger block size should be used to take advantage of the greater compression capability offered by a larger block size.

After the block size determination procedure described above is performed, a discrete cosine transform is applied to the resulting variably sized blocks. The resulting transform coefficients in array form are compressed by thresholding and quantization in the manner discussed above. The compressed transform coefficients are then zigzag scanned to form a one dimensional sequence of transform coefficients which are then coded for transmission to a remote receiver or for storage in a memory.

In comparison to the conventional transform coding algorithm, the adaptive transform coding algorithm based on variable block size achieves the same or better visual quality with a lower average bit rate.

DETAILED DESCRIPTION OF THE INVENTION

Figure 1:
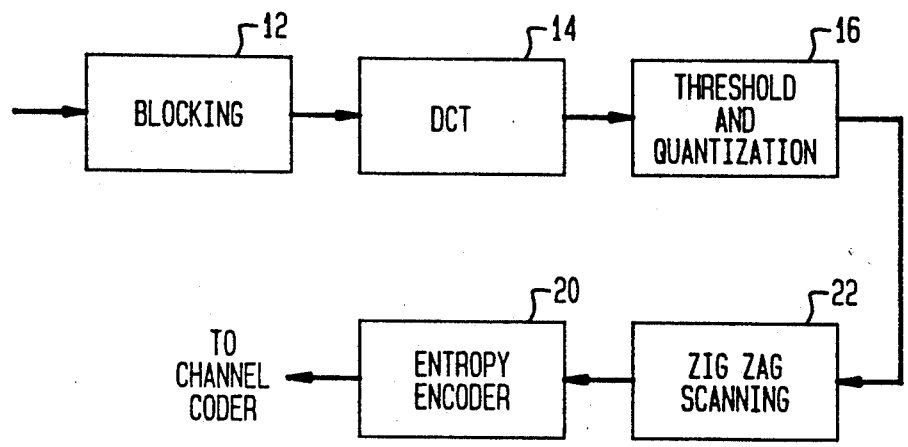
FIG. 1 schematically illustrates a conventional transform coding algorithm for a still image.

A conventional transform coding algorithm for a still image is schematically illustrated by the block diagram of FIG. 1.

A still image signal to be coded comprises a two-dimensional array of pixels, e.g., 512×512 pixels. The still image signal is divided (step 12 of FIG. 1) into disjoint blocks of smaller size, e.g., 8×8 or 16×16 blocks of pixels.

A two-dimensional discrete cosine transform is applied to each block of pixels.(step 14 of FIG. 1).

The two-dimensional discrete cosine transform of a two-dimensional pixel value array f(j,k) for j,k=0,1...n−1 can be defined as $$F(u,v) = \frac{4c(u)c(v)}{n^2} \sum_{j=0}^{n-1} \sum_{k=0}^{n-1} f(j,k) \cos\left[\frac{(2j+1)u\pi}{2n}\right] \cos\left[\frac{(2k+1)v\pi}{2n}\right] \quad (2)$$

for u,v=0,1,... N−1, where $$c(w) = \begin{cases} \frac{1}{\sqrt{2}} & \text{for } w = 0 \\ 1 & \text{for } w = 1, 2 \ldots n-1 \end{cases} \quad (3)$$

Thus, F(u,v) for u,v=0,1,... n−1 represents a two-dimensional array of transform coefficients.

The inverse transform is then given by $$f(j,k) = \sum_{u=0}^{n-1} \sum_{v=0}^{n-1} c(u)c(v)F(u,v) \cos\left[\frac{(2j+1)u\pi}{2n}\right] \cos\left[\frac{(2k+1)v\pi}{2n}\right] \quad (4)$$

The coefficients F(u,v) obtained for a block of pixels may be viewed as comprising DC and AC coefficients. The DC coefficient is F(0,0) which represents the average intensity of the block. The remainder of the coefficients (F(0,1), F(1,0)etc.) are AC coefficients.

Illustratively, the transform coefficients F(u,v) obtained by applying the discrete cosine transform to each block of pixels in the input image are normalized to a range of [−255,255] for the AC coefficients and [0,510] for the DC coefficient if the input image data range from [0,255], i.e., 8 bits per pixel.

The two-dimensional array of the transform coefficients F(u,v) obtained for each block of pixels is then compressed by thresholding and quantization (step 16 of FIG. 1).

In particular, each of the coefficients except the DC coefficient F(0,0) is thresholded and each of the coefficients is quantized.

The characteristics of the thresholding step are as follows:

$$F_T(u,v) = \begin{cases} o & \text{if } |F(u,v)| < T \\ F(u,v), & \text{otherwise} \end{cases} \quad (5)$$

where $F_T(u,v)$ represents the thresholded coefficients and T is a predetermined threshold value. This means that if the magnitude of a coefficient is less than T it is set to zero. In some thresholding processes, when the magnitude of a coefficient is greater than T, T is subtracted from a positive coefficient and added to a negative coefficient.

The characteristics of the quantizing step are as follows:

$$F_{TQ}(u,v) = NINT(F_T(u,v)/Q) \quad (6)$$

where $F_{TQ}(u,v)$ is a thresholded and quantized transform coefficient, Q is a quantization step size and NINT is the nearest integer function. Thus, a quantized and thresholded transform coefficient $F_{TQ}(u,v)$ is obtained from a thresholded coefficient $F_T(u,v)$ by scaling with a step size Q and rounding to the nearest integer. The DC coefficient F(0,0) (which is not thresholded) is quantized with Q=1 to ensure intensity continuity within the image.

After compression, the two-dimensional array of transform coefficients $F_{TQ}(u,v)$ u=0,1,... n−1,v=0,1, ... n−1 is zig-zag scanned (step 18 of FIG. 1) (see the Chen et al reference identified above) into a one-dimensional sequence of transform coefficients to facilitate encoding. The one-dimensional sequence of transform coefficients is then coded (step 20 of FIG. 1) using an entropy encoding process to form a bit stream which may be transmitted to a channel coder for transmission to a remote receiver or stored in a memory.

As indicated above, the present invention modifies the above-identified algorithm so that the pixel block size is adaptive based on image contents. Before discussing the inventive algorithm in detail it will be helpful to discuss a data structure known as a quadtree data structure. The quadtree data structure is useful for understanding the determination of block size in accordance with the inventive algorithm.

Figure 2:
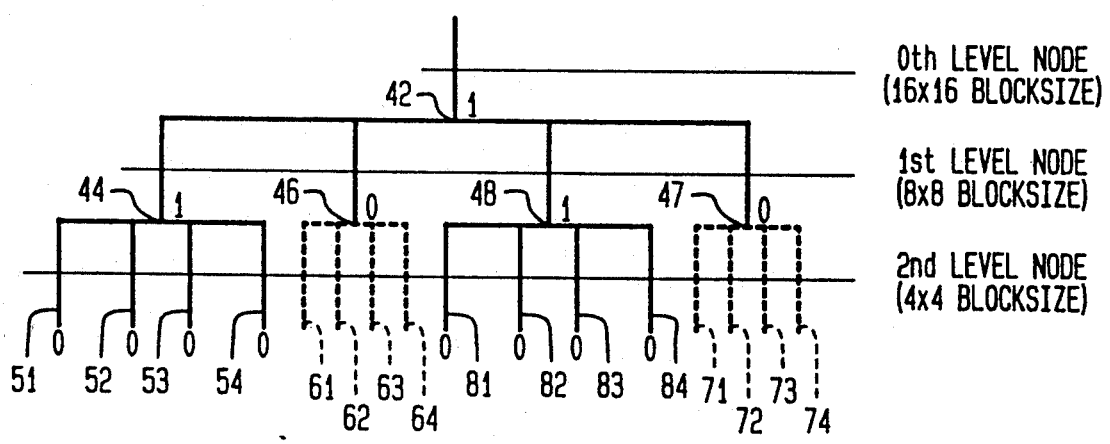
FIG. 2 schematically illustrates a three-level quadtree structure and its binary representation.

The quadtree 40 of FIG. 2 is a hierarchical data structure where each node (e.g. 42, 44) generates four children, unless it is a leaf (e.g. 46). Thus, the node 44 has four children 51, 52, 53, 54. The children 61, 62, 63, 64 of the node 46, which are shown in phantom, have been removed from the quadtree structure so that the node 46, as stated above, has no children and is a leaf. Similarly, the nodes 51, 52, 53, 54 are childless and are also leaves.

All nodes originating from the same parent are brother/sister nodes to each other. Thus, the nodes 51, 52, 53, 54 are such brother/sister nodes. In FIG. 2, non-leaf and leaf nodes are represented by logic "1" and logic "0" respectively. The node 42 at the top of the quadtree structure of FIG. 2 is a root, which is also defined as a $0^{th}$ level node. If a node is an $i^{th}$ level node, then all the other nodes in the same generation are also $i^{th}$ level nodes. The children, if any, of an $i^{th}$ level node are $(i+1)^{th}$ level nodes. The quadtree structure 40 of FIG. 2 is a three level structure. The $0^{th}$ level includes the root node 42. The first level includes the nodes 44, 46, 47, 48 and the second level includes the nodes 51, 52, 53, 54.

As indicated above, the present invention is an adaptive transform coding technique wherein adaptivity is achieved via a variable block size determined according to block attribute. The adaptive transform coding algorithm of the present invention is illustrated in FIG. 3.

A process (100 of FIG. 3) for choosing a block size based on image content is now considered in detail. First the image is divided into relatively large M×M blocks (step 102 of FIG. 3). Each M×M block may be viewed as a root node in a quadtree data structure.

The smallest sub-block size of interest in the algorithm is N×N where $M = N \times 2^{K-1}$, where K is a positive integer.

Figure 3:
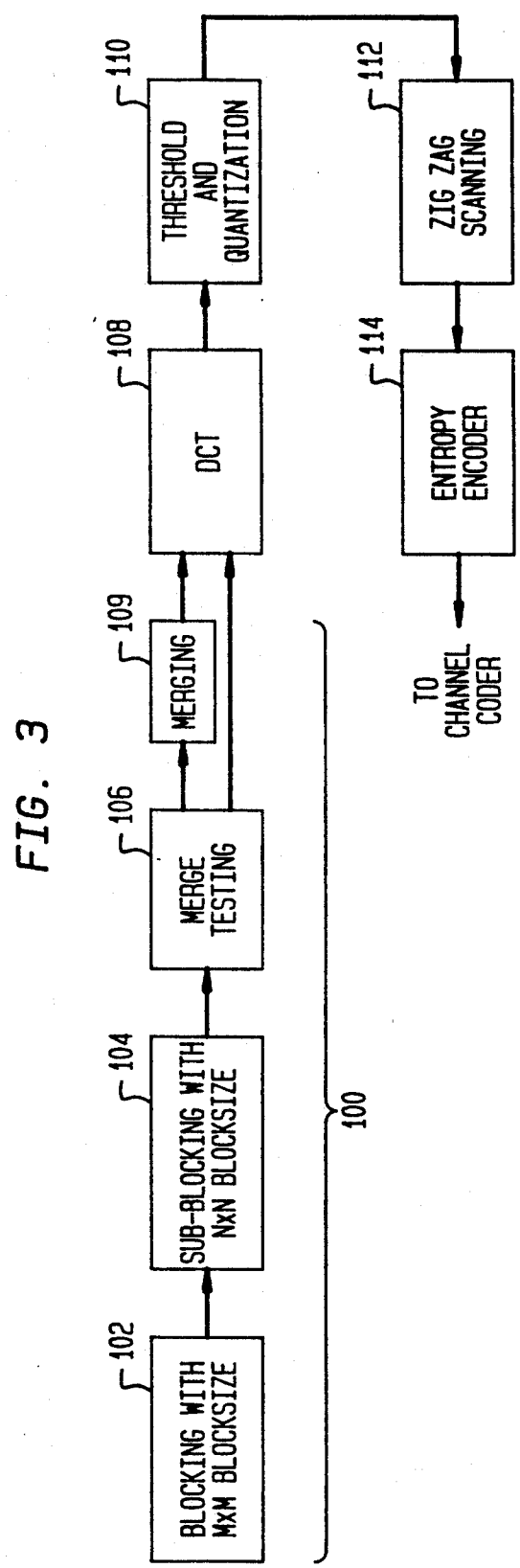
FIG. 3 schematically illustrates an adaptive transform coding algorithm using variable block size in accordance with an illustrative embodiment of the present invention.

Each M×M block is decomposed into $4^{K-1}$ sub-blocks of size N×N by successively splitting each block into four equally sized sub-blocks until the smallest sub-block size of N×N is reached (step 104 of FIG. 3). The sub-blocks which result from splitting an M×M block (K−1) times may be represented by a full K level quadtree structure (i.e. a K level quadtree structure in which all children are present) wherein each node represents a sub-block of pixels. In particular, an $i^{th}$ level node represents a sub-block of size $M/2^i \times M/2^i$.

Illustratively, a three level partition may be utilized. Thus, M may be set equal to 16 so that the largest block size of interest is 16×16. This block corresponds to the $0^{th}$ level root node 42 of the quadtree structure of FIG. 2. The 16×16 block is first divided into four 8×8 sub-blocks corresponding to the first level nodes of FIG. 2. Each 8×8 sub-block is then divided into four 4×4 sub-blocks corresponding to the second level nodes of FIG. 2. Some of the second level nodes, e.g. 61, 62, 63, 64 are shown in phantom in FIG. 2. For the reasons stated below, these nodes and the sub-blocks corresponding to them have been removed from the quadtree structure.

In accordance with the variable block size adaptive transform coding algorithm, a test is made (step 106 of FIG. 3) to determine if a discrete cosine transform should be applied to the childless sub-blocks of size N×N. The test uses a decision rule involving four adjacent childless brother/sister sub-blocks. If the test is positive the discrete cosine transform is applied (step 108 of FIG. 3) to the four childless N×N brother/sister sub-blocks. If the test is negative, these sub-blocks are merged (step 109 of FIG. 3) into one 2N×2N sub-block. The 2N×2N sub-block formed by such a merger is childless. In other words, the nodes representing the now merged N×N sub-blocks are removed from the quadtree structure so that the node representing the parent 2N×2N sub-block becomes a leaf.

In the three level example shown in FIG. 2, the test is applied to the set of brother/sister 4×4 sub-blocks represented by the nodes 51, 52, 53, 54; the set of brother/sister 4×4 sub-blocks represented by the nodes 61, 62, 63, 64; the set of brother/sister 4×4 sub-blocks represented by the nodes 81, 82, 83, 84 and the set of brother/sister 4×4 sub-blocks represented by the nodes 71, 72, 73, 74.

The 4×4 sub-blocks represented by nodes 61, 62, 63, 64 (shown in phantom) are removed by merging them into the 8×8 sub-block represented by the node 46. Thus, as a result of the test and merger steps the node 46 becomes a leaf whose binary representation, as indicated above, is a logic "0". Similarly, the 4×4 sub-blocks represented by the nodes 71, 72, 73, 74 (shown in phantom) are removed by merging them into the 8×8 sub-block represented by the node 47. On the other hand, the 4×4 sub-blocks represented by the nodes 51, 52, 53, 54 are not merged and the sub-blocks represented by the nodes 81, 82, 83, 84 are not merged. Thus, the discrete cosine transform is applied individually to these sub-blocks.

The test and selective merger process is repeated at each level of the hierarchy for each set of four sub-blocks represented by brother/sister nodes which are all leaves (i.e. which have no children and are thus represented by logic value "0") until a level in the hierarchy is reached in which there are no sets of brother/sister nodes which are all leaves or until the root node is reached. The discrete cosine transform is then applied individually to the resulting arrangement of blocks of variable size.

In the three level structure of FIG. 2, the test and selective merger process is not applied at the level i=1 because there is no set of four brother/sister nodes which are leaves. Instead, at the level i=1, there are two nodes which are leaves (46, 47) and two nodes which are not leaves (44, 48). Thus, in the example of FIG. 2, the discrete cosine transform is applied individually to the 4×4 sub-blocks represented by the nodes 51, 52, 53, 54 and the nodes 81, 82, 83, 84. The discrete cosine transform is also applied individually to the 8×8 sub-blocks represented by the nodes 46, 47.

The decision rule which determines whether to merge a particular set of four childless brother/sister sub-blocks is based on the differences in mean pixel values of the four adjacent brother/sister sub-blocks. Assuming that the blocks are $i^{th}$ level blocks and that the mean pixel value of the $k^{th}$ sub-block is $m_i(k)$, for k=1,2,3,4, then if there is a j≠k such that $|m_i(j) - m_i(k)| > t_i$, do not merge, otherwise merge.

Note, that $t_i$ is a predetermined value for the $i^{th}$ level in the quadtree structure. Different values may be utilized at different levels in the quadtree structure.

As indicated above, in discrete cosine transform coding, large block size introduces visible degradation if the block contains high contrast edges. Therefore, it is desirable to keep the blocksize as small as possible for these areas. The above-described process, involving use of a hierarchy of sub-blocks and testing and selective merging steps based on a decision rule using mean pixel values, serves to divide each M×M block from areas containing high contrast edges into sub-blocks of relatively small size. In contrast, M×M blocks from other image areas where the human visual system is not sensitive to degradation are divided into sub-blocks of larger size or not divided at all to achieve greater compression.

After the quadtree structure of sub-blocks is obtained, the discrete cosine transform is applied to the sub-blocks (step 108, FIG. 3). The transform coefficients resulting from application of the transform to each sub-block are then compressed by thresholding with a threshold value T and quantizing with a quantization step size Q (step 110 of FIG. 3). As indicated above, the image quality and bit rate are determined at least in part by the compression parameters T and Q. In accordance with an illustrative embodiment of the invention, different compression parameters T and Q may be chosen for sub-blocks of different size (i.e. for sub-blocks at different levels of the quadtree structure).

After compression, the transform coefficients of a sub-block of pixels are zigzag scanned (step 112 of FIG. 3) to convert the transform coefficients from an array to a sequence. The sequence of transform coefficients is then encoded (step 114 of FIG. 3) using for example entropy coding. The resulting bit stream is then sent to a channel coder for transmission to a remotely located receiver or stored in a memory. For entropy coding, different code books may be used for each block size according to its statistics.

For reconstruction of a block of pixels (i.e. an original $M \times M$ block) from the bit stream received at a remote receiver, it is necessary to inform the receiver of the quadtree structure used to partition the block. For this reason, some overhead bits are sent along with the image data. In practice, the bit value (logic "1" or logic "0") assigned to each node in the quadtree represent this overhead. This overhead is extremely trivial for a three or four level quadtree block partition structure. It should be noted that if the receiver has a priori knowledge of the number of levels in the quadtree structure, it is not necessary to send the information concerning the lowest level nodes in the quadtree structure. In the example of FIG. 2, the overhead bits may be 11010 corresponding to nodes 42, 44, 46, 48, 47, respectively. It is well worth mentioning that using different compression parameters and different code books for different sub-block sizes does not require additional overhead since the information is contained in the quadtree structure.

At a receiver, a received bit stream corresponding to a sub-block of pixels is decoded and the received transform coefficients are expanded by the appropriate quantization step size. An inverse orthogonal transform such as an inverse discrete cosine transform is then used to reconstruct the sub-block of pixels.

In an illustrative example of the inventive algorithm, the input image is 8 bits per pixel [0,255] and its size is $512 \times 512$. A three level block size partition scheme is utilized in which the largest block size of interest is $16 \times 16$ and the smallest block size of interest is $4 \times 4$. The decision thresholds $t_i$ in the block partitioning scheme are set to 10 for both i=1 and i=2 in the three level partition scheme. The partitioning scheme serves to divide the image into a mosaic of $16 \times 16$, $8 \times 8$, and $4 \times 4$ blocks depending on the contents of particular areas in the image.

After the discrete cosine transform is applied to the $16 \times 16$, $4 \times 4$ and $8 \times 8$ blocks, the transform coefficients are normalized to a range of [0,510] for the DC transform coefficients and [−255,255] for the AC transform coefficients. Note that if the discrete cosine transform is defined as in Equation (2) above, these ranges are achieved automatically when the input data ranges from [0,255].

For compression, the threshold value T is set to zero for all block sizes and the quantization step size Q is set to 1,3, and 6 for $16 \times 16$, $8 \times 8$ and $4 \times 4$ blocks, respectively.

For an image comprising text, the bit rate achieved using the variable block size adaptive transform coding algorithm is 2.2548 bits per pixel. The mean square error is 4.5 and the quadtree overhead is 0.01616 bits per pixel. In contrast, when the same "text" image is encoded using the conventional discrete cosine transform algorithm, with a $16 \times 16$ block size and a quantization step size of Q=4.0, the bit rate is 2.3639 bits per pixel and the corresponding mean square error is 66.1. Thus, the inventive algorithm provides a better quality reconstructed image at a lower bit rate than the conventional algorithm.

Finally, the above-described embodiments of the invention are intended to be illustrative only. Numerous alternative embodiments may be devised by those skilled in the art without departing from the spirit and scope of the following claims.

What is claimed is:

1. A method for processing a signal corresponding to a still image so that said still image can be transmitted to a remote location via a channel, said method comprising the steps of providing a signal comprising a two-dimensional array of pixels which is representative of a still image, dividing said signal into blocks of pixels of size $M \times M$, each of said $M \times M$ blocks of pixels having a content, splitting each of said $M \times M$ blocks to produce a hierarchy of sub-blocks including the levels designated i=0,1,2, . . . ,K−1, so that at each level of the hierarchy, there are 4i sub-blocks of size $M/2^i \times M/2^i$, i=0,1, . . . ,K−1, where K is an integer, starting with the K−1 level in said hierarchy and proceeding to successive levels in said hierarchy, merging adjacent of said sub-blocks when the differences in the mean pixel value of said sub-blocks is below a predetermined threshold, applying an orthogonal transform individually to each of said sub-blocks comprising said $M \times M$ blocks of pixels to form transform coefficients for each of said sub-blocks, utilizing an encoder to convert the transform coefficients for each sub-block into a signal in the form of a stream of bits, and transmitting said signal in the form of a stream of bits for each of said sub-blocks via a channel to a receiver at a remote location.

2. The method of claim 1 wherein said orthogonal transform is a discrete cosine transform.

3. The method of claim 2 wherein sub-blocks of different sizes are coded using different codes.

4. The method of claim 1 wherein said method further comprises the steps of compressing the transform coefficients resulting from the application of an orthogonal transform to each sub-block of pixels and coding the compressed transform coefficients.

5. The method of claim 4 wherein said compressing step comprises thresholding said transform coefficients with a threshold value T and quantizing said transform coefficients with a quantization step size Q.

6. The method of claim 5 wherein said quantization step size Q is chosen individually for each different sub-block size.

7. The method of claim 5 wherein said threshold value T is chosen individually for each different sub-block size.

8. The method of claim 1 wherein said transmitting step comprises transmitting the stream of bits for each sub-block to a channel coder for transmission to said remote location.

9. A method for processing a signal corresponding to a still image so that said still image can be transmitted to a remote location via a channel, said method comprising the steps of providing a signal comprising a two-dimensional array of pixels which is representative of a still image, dividing said signal into blocks of pixels of size $M \times M$, each of said $M \times M$ blocks of pixels having a content, depending on the content of each of said $M \times M$ blocks of pixels, selectively decomposing each of said $M \times M$ blocks of pixels into one or more sub-blocks of pixels, each of said sub-blocks being of a size given by $M/2^i \times M/2^i$, where $i = 0, 1, 2, \ldots, K-1$ and where K is an integer, said decomposing step comprising splitting each of said $M \times M$ blocks to produce a hierarchy of sub-blocks including the levels designated $i = 0, 1, \ldots K-1$, so that at each level of the hierarchy, there are $4^i$ sub-blocks of size $M/2^i \times M/2^i$, $i = 0, 1, \ldots K-1$, and starting at the level of $K-1$ in said hierarchy and proceeding to successive levels in said hierarchy, testing each set of four childless brother/sister sub-blocks and merging each set of four childless brother/sister sub-blocks in which the difference of mean pixel value of any two sub-blocks is smaller than a predetermined value until a level in the hierarchy is reached wherein there are no sets of childless brother/sister sub-blocks to be tested, applying an orthogonal transform individually to each of said sub-blocks comprising said $M \times M$ blocks of pixels to form transform coefficients for each of said sub-blocks, utilizing an encoder to convert the transform coefficients for each sub-block into a signal in the form of a stream of bits, and transmitting said signal in the form of a stream of bits for each of said sub-blocks via a channel to a receiver at a remote location.

10. A method for processing a signal corresponding to a still image so that said still image can be transmitted to a remote location via a channel, said method comprising the steps of providing a signal comprising a two-dimensional array of pixels which is representative of a still image, dividing said signal into blocks of pixels of size $M \times M$, each of said $M \times M$ blocks of pixels having a content, depending on the content of each of said $M \times M$ blocks of pixels, selectively decomposing each of said $M \times M$ blocks of pixels into one or more sub-blocks of pixels, each of said sub-blocks being of a size given by $M/2^i \times M/2^i$, where $i = 0, 1, 2, \ldots, K-1$ and where K is an integer, said decomposing step comprising splitting each of said $M \times M$ blocks to produce a hierarchy of sub-blocks including the levels designated $i = 0, 1, \ldots K-1$, so that at each level of the hierarchy, there are $4^i$ sub-blocks of size $M/2^i \times M/2^i$, $i = 0, 1, \ldots K-1$, and starting at the level of $K-1$ in said hierarchy and proceeding to successive levels in said hierarchy, testing each set of four childless brother/sister sub-blocks and merging each set of four childless brother/sister sub-blocks in which the difference of mean pixel value of any two sub-blocks is smaller than a predetermined value, chosen individually for each level in said hierarchy, until a level in the hierarchy is reached wherein there are no sets of childless brother/sister sub-blocks to be tested, applying an orthogonal transform individually to each of said sub-blocks comprising said $M \times M$ blocks of pixels to form transform coefficients for each of said sub-blocks, utilizing an encoder to convert the transform coefficients for each sub-block into a signal in the form of a stream of bits, and transmitting said signal in the form of a stream of bits for each of said sub-blocks via a channel to a receiver at a remote location.

11. A method for processing a signal corresponding to a still image comprising the steps of providing a signal comprising a two dimensional array of pixels which is representative of a still image, dividing said signal comprising said two-dimensional array of pixels into blocks of pixels of varying sizes such that smooth areas of said image are smaller sized blocks and busy areas of said image are larger sized blocks, said dividing step comprises dividing said image into $M \times M$ blocks of pixels, splitting said $M \times M$ blocks to produce a hierarchy of sub-blocks including the levels designated $1 = 0, 1, \ldots K-1$, where K is an integer, so that at each level of the hierarchy there are $4^i$ sub-blocks of size $M/2^i \times M/2^i$, and starting with the $K-1$ in the hierarchy and proceeding to successive levels in the hierarchy, testing each set of four childless brother/sister sub-blocks and merging each set of four childless brother/sister sub-blocks and merging each set of four childless brother/sister sub-blocks in which the difference of mean pixel value of any two sub-blocks is smaller than a predetermined value until a level in the hierarchy is reached in which there are no sets of four childless brother/sister sub-blocks to be tested, applying the orthogonal transform to each of said blocks of pixels to form a two-dimensional array of transform coefficients for each of said blocks of pixels, compressing the transform coefficients obtained for each block of pixels to form a two-dimensional array of compressed transform coefficients for each of said blocks of pixels, scanning the two-dimensional array of compressed transform coefficients to form a signal comprising a one-dimensional sequence of transform coefficients for each block of pixels, utilizing an encoder to encode the signal comprising a one-dimensional sequence of transform coefficients for each block to form a bit stream representative of a still image, and transmitting said bit stream via a channel to a receiver at a remote location.

12. A method for processing a signal corresponding to a still image comprising the steps of providing a signal comprising a two dimensional array of pixels which is representative of a still image, dividing said signal comprising said two-dimensional array of pixels into blocks of pixels of varying sizes such that smooth areas of said image are smaller sized blocks and busy areas of said image are larger sized blocks, said dividing step comprising dividing said image into M×M blocks of pixels,
splitting said M×M blocks to produce a hierarchy of sub-blocks including the levels designated $l=0,1,\ldots K-1$, where K is an integer, so that at each level of the hierarchy there are $4^i$ sub-blocks of size $M/2^i \times M/2^i$, and
starting with the K−1 in the hierarchy and proceeding to successive levels in the hierarchy, testing each set of four childless brother/sister sub-blocks and merging each set of four childless brother/sister sub-blocks and merging each set of four childless brother/sister sub-blocks in which the difference of mean pixel value of any two sub-blocks is smaller than a predetermined value, determined individually for each level in the hierarchy, until a level in the hierarchy is reached in which there are no sets of four childless brother/sister sub-blocks to be tested,
applying the orthogonal transform to each of said blocks of pixels to form a two-dimensional array of transform coefficients for each of said blocks of pixels,
compressing the transform coefficients obtained for each block of pixels to form a two-dimensional array of compressed transform coefficients for each of said blocks of pixels,
scanning the two-dimensional array of compressed transform coefficients to form a signal comprising a one-dimensional sequence of transform coefficients for each block of pixels,
utilizing an encoder to encode the signal comprising a one-dimensional sequence of transform coefficients for each block to form a bit stream representative of a still image, and
transmitting said bit stream via a channel to a receiver at a remote location.

13. A method for processing a signal corresponding to a still image comprising the steps of
providing a signal comprising of two dimensional array of pixels which is representative of a still image,
dividing said signal comprising said two-dimensional array of pixels into blocks of pixels of varying sizes such that the size of said blocks is determined by finding boundaries where the abutting edges of said varying sized blocks are high contrast edges,
applying the orthogonal transform to each of said blocks of pixels to form a two-dimensional array of transform coefficients for each of said blocks of pixels,
compressing the transform coefficients obtained for each block of pixels to form a two-dimensional array of compressed transform coefficients for each block of pixels,
scanning the two-dimensional array of compressed transform coefficients to form a signal comprising one-dimensional sequence of transform coefficients for each block of pixels,
utilizing an encoder to encode the signal comprising a one-dimensional sequence of transform coefficients for each block to form a bit stream representative of a still image, and
transmitting said bit stream via a channel to a receiver at a remote location.

14. A method for processing a signal comprising the steps of
providing a signal comprising a two-dimensional array of pixels which is representative of a still image,
dividing said signal comprising a two-dimensional array of pixels into blocks of pixels of size M×M, each of said M×M blocks of pixels having a content,
selectively decomposing each of said M×M blocks into one or more sub-blocks,
comparing adjacent sub-blocks and merging said adjacent sub-blocks when the edges of said adjacent sub-blocks are not in high-contrast,
applying the discrete cosine transform to each of said sub-blocks to form transform coefficients,
compressing the transform coefficients formed for each of said sub-blocks to form compressed transform coefficients,
utilizing an encoder to form a bit stream corresponding to the compressed transform coefficients, and
passing the bit stream to a channel coder for transmission via a channel to a receiver at a remote location.

15. The method of claim 14 wherein said selective decomposing step comprises the steps of successively splitting each M×M block to form a hierarchy of sub-blocks and selectively merging sets of childless brother/sister sub-blocks at one or more levels in said hierarchy.

16. A method for processing a signal comprising the steps of
providing a signal comprising a two-dimensional array of pixels which is representative of a still image,
dividing said signal comprising a two-dimensional array of pixels into blocks of pixels of size M×M, each of said M×M blocks of pixels having a content,
decomposing each of said M×M blocks into one or more sub-blocks,
comparing adjacent sub-blocks and merging said adjacent sub-blocks when the edges of said adjacent sub-blocks are not in high contrast,
applying an orthogonal transform to each of said sub-blocks to form transform coefficients,
compressing the transform coefficients formed for each of said sub-blocks to form compressed transform coefficients,
utilizing an encoder to form a bit stream corresponding to the compressed transform coefficients, and
storing the bit stream in a memory.

* * * * *